(12) United States Patent
Christian et al.

(10) Patent No.: US 8,073,953 B2
(45) Date of Patent: Dec. 6, 2011

(54) MAPLESS GLOBAL SERVER LOAD BALANCING OF NETWORK TRAFFIC USING ANYCAST ROUTING

(75) Inventors: Michael F. Christian, Pacifica, CA (US); David Apgar, San Francisco, CA (US); Igor Gashinsky, New York, NY (US); Leif Hedstrom, Arvada, CO (US); Nitzan Katz, Palo Alto, CA (US); Erik Reed, Dublin, CA (US); Ryan Troll, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 12/790,452

(22) Filed: May 28, 2010

(65) Prior Publication Data

US 2010/0235441 A1    Sep. 16, 2010

Related U.S. Application Data

(62) Division of application No. 11/966,989, filed on Dec. 28, 2007, now abandoned.

(51) Int. Cl.
    *G06F 15/173*    (2006.01)
    *G06F 15/16*    (2006.01)

(52) U.S. Cl. ......... 709/226; 709/203; 709/245; 718/105

(58) Field of Classification Search .......... 709/202–203, 709/238–239, 226, 229, 245–246; 718/102, 718/105
    See application file for complete search history.

(56) References Cited

U.S. PATENT DOCUMENTS

| | | | |
|---|---|---|---|
| 6,718,359 B2 * | 4/2004 | Zisapel et al. | 718/105 |
| 6,976,090 B2 * | 12/2005 | Ben-Shaul et al. | 709/245 |
| 7,139,840 B1 | 11/2006 | O'Toole | |
| 7,159,034 B1 | 1/2007 | Rai | |
| 7,333,794 B2 | 2/2008 | Zappala | |
| 7,392,325 B2 * | 6/2008 | Grove et al. | 709/238 |
| 7,418,518 B2 * | 8/2008 | Grove et al. | 709/238 |
| 7,512,702 B1 | 3/2009 | Srivastava et al. | |
| 7,725,602 B2 * | 5/2010 | Liu et al. | 709/245 |
| 2003/0055979 A1 * | 3/2003 | Cooley | 709/224 |
| 2005/0198386 A1 * | 9/2005 | Accapadi et al. | 709/245 |
| 2006/0193252 A1 | 8/2006 | Naseh et al. | |
| 2006/0235972 A1 | 10/2006 | Asnis | |
| 2007/0036146 A1 | 2/2007 | Adkins et al. | |
| 2007/0060102 A1 | 3/2007 | Immonen et al. | |
| 2008/0052387 A1 | 2/2008 | Heinz et al. | |
| 2008/0052393 A1 | 2/2008 | McNaughton et al. | |
| 2008/0052394 A1 | 2/2008 | Bugenhagen et al. | |

(Continued)

*Primary Examiner* — Bharat Barot (74) *Attorney, Agent, or Firm* — Hickman Palermo Truong & Becker LLP; Karl T. Rees (57) ABSTRACT

Techniques are described for directing connections between clients and the closest web server. Authoritative DNS resolvers of a network are placed at edges of the network. Using anycast, the authoritative DNS resolvers advertise routes of their destination netblock to the Internet. A request from a client to connect to the network is routed, based upon BGP tables, to the closest particular authoritative DNS resolver. Once the request is received, a response is sent to the client with the IP address of the closest web server. The closest web server is determined through in-network health check measurements, with the authoritative DNS resolvers dynamically selecting IP addresses closest to themselves. Routing protocols that directed the packet to the closest authoritative DNS resolver also dictate the route of subsequent traffic to the network. Thus, the closest web server selected by the authoritative DNS resolver is also the closest web server to the client.

21 Claims, 5 Drawing Sheets

U.S. PATENT DOCUMENTS

2008/0052401 A1   2/2008   Bugenhagen et al.
2008/0167886 A1   7/2008   Marcken
2009/0100128 A1   4/2009   Czechowski et al.
2009/0164646 A1   6/2009   Christian et al.

* cited by examiner

MAPLESS GLOBAL SERVER LOAD BALANCING OF NETWORK TRAFFIC USING ANYCAST ROUTING

CROSS-REFERENCE TO RELATED APPLICATIONS; PRIORITY CLAIM

This application claims benefit as a Divisional of application Ser. No. 11/966,989, filed Dec. 28, 2007, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to global traffic management on a network, and specifically, to directing a client to a particular server based on certain criteria.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Global load balancing or "GLB," distributes client access to servers across a distributed set of servers. The set of servers across which client access is distributed may, for example, be servers on a wide area network such as the Internet. For the purpose of discussion, examples shall be given in which GLB is used to distribute client access across servers on the Internet. The types of servers for client access may vary widely, and includes, but is not limited to, HTTP web servers, FTP servers, SMTP (mail) servers, other standard Internet protocol servers, or servers with proprietary protocols. As used herein, the term "server" shall mean any type of server listed previously.

Many GLBs use a variety of active and passive monitoring techniques to generate a complex map of the Internet. Based upon this map, the GLB makes traffic routing decisions to connect a client to the "closest" server. As used herein, "close" does not necessarily mean basing the determination only on geographic proximity. As used herein, a "close" server is a server that results in the fastest connection to the client. Thus, if a server that was located 100 miles away were slower for the client to reach than a server located 200 miles away because of heavy network congestion, then the GLB would route the client to the server 200 miles away.

Figure 1:
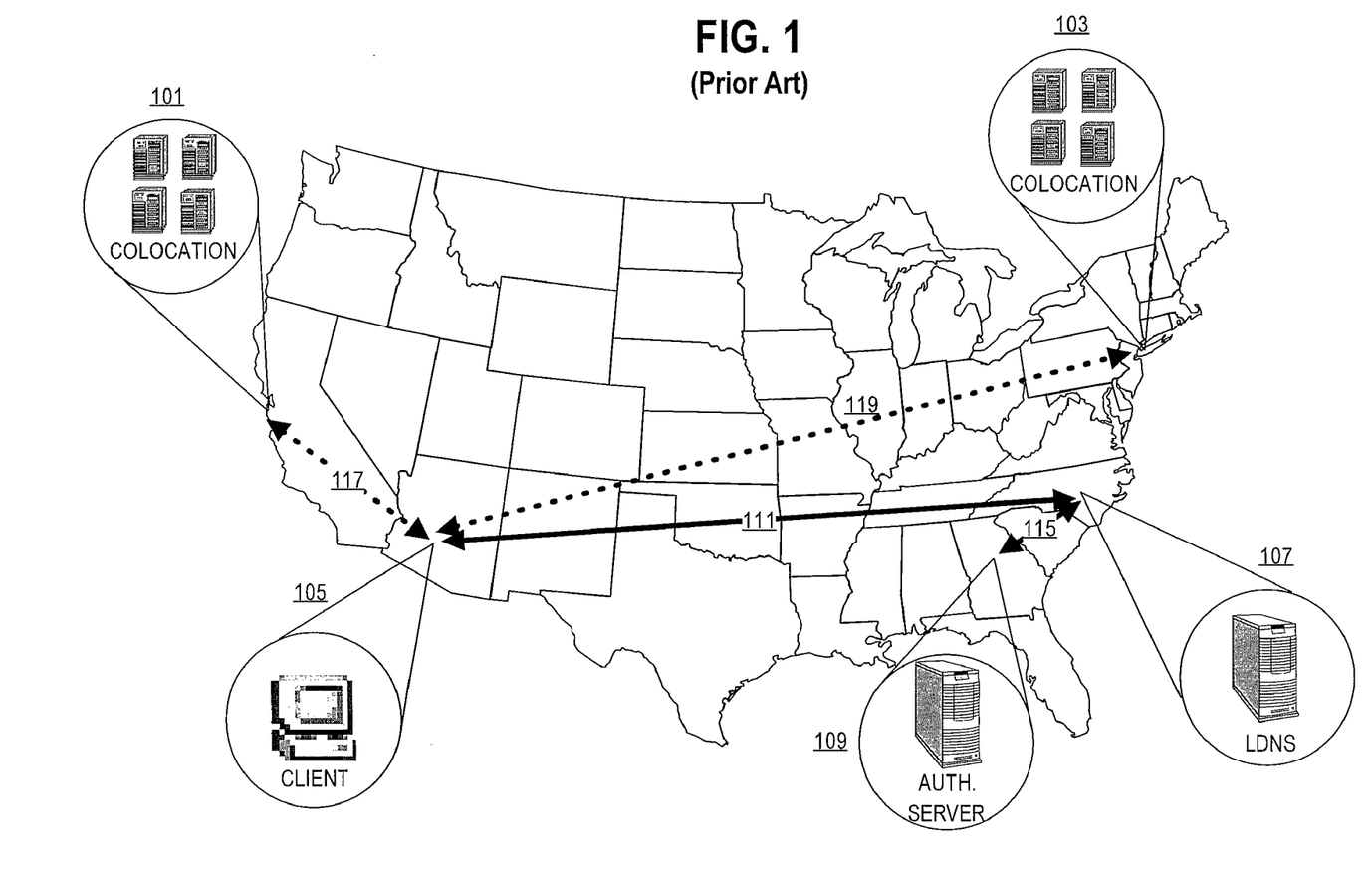
FIG. 1 is a diagram of global load balancing based upon DNS.

The most common form of global load balancing is based upon domain name service ("DNS") which is illustrated in FIG. 1. In the system illustrated in FIG. 1, two or more data centers, which may be located in geographically distinct areas, contain large numbers of servers capable of hosting web applications. A client 105 wishes to connect to a web application that is hosted by each of two data centers. For example, one data center that hosts the web application might be located in New York 103 and the other data center that hosts the web application might be located in San Francisco 101.

Internet service providers ("ISPs") may use a centralized local name resolver, also called a recursive DNS resolver, that resides within the ISP's network and communicates with the ISP's users to service their DNS requests. The client communicates with the local name resolver, and then the local name resolver determines where to find the information that the user requested. An authoritative DNS resolver of a domain receives the request from a local name resolver and sends the local name resolver the IP address of the domain. An authoritative DNS resolver of a domain is a server that resides within and maintains data for the network of a domain. GLB may be a part of the authoritative DNS resolver or may be separate from the authoritative DNS resolver. As used herein, the term "resolver" shall refer to the authoritative DNS resolver, with which a GLB may or may not be a part.

For example, in FIG. 1, client 105 sends a request 111 to local name resolver 107 comprising a domain name, such as "www.sampledomain.com." The local name resolver 107 asks 115 the authoritative DNS resolver 109 that is the owner of "www.sampledomain.com," for the IP address of "www.sampledomain.com." The authoritative DNS resolver (and GLB) for "www.sampledomain.com" 109 responds to the local name resolver 107 with an IP address of a data center based upon the information in the map generated by the GLB. If the GLB detects high traffic to the data center in San Francisco 101, then the GLB might send the connection to the "closer" data center in New York 103, even though geographically, the data center in New York 103 is much farther away from the client 105. The local name resolver 107 sends the IP address of the data center in New York 103 to the client 105. Then, and only then, the client 105 connects 119 to the data center in New York 103 and does not connect 117 to the data center located in San Francisco 101.

Upon changes in network topology or connectivity, such as fiber cuts, equipment problems, capacity issues, netblock migration, or human intervention, the Internet map needs to be rebuilt, often from ground up. Depending upon the protocols and algorithms used to create or update the map, this process could take a significant amount of time. Due to the dynamic nature of internet topology, the GLB may have difficulty maintaining a full, accurate model of the internet. The resulting inaccuracies in the map may lead to incorrect routing decisions, which may have severe implications for client to server performance. As a result, there is a need for techniques that provide the "closest" connection to a server that are not based upon generating and maintaining a map of the internet with DNS-based GLB.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described to connect a client to a server using techniques that do not rely on generating a map of the network to which the server belongs (e.g. the Internet). In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a plurality of authoritative DNS resolvers is placed at different locations on the edges of a provider's network. As used herein, the "edge" of a network is the part of a network that is the connection point or entry point of the network from another network. The other network may include, but is not limited to, another private network or the Internet. The provider's network also comprises servers to which the client may connect to the provider's network. The types of servers in the provider's network may vary widely, and includes, but is not limited to, HTTP web servers, FTP servers, SMTP (mail) servers, other standard Internet protocol servers, or servers with proprietary protocols. The plurality of authoritative DNS resolvers announces a destination IP address that allows IP packets to be routed to the "closest" authoritative DNS resolvers. When a request to connect to the provider's network is received by the authoritative DNS resolver from a client, the authoritative DNS resolver replies with an IP address of a web server to which the client may connect.

In an embodiment, global load balancing, with the authoritative DNS resolvers, dynamically selects IP addresses to web servers based on the "closeness" of the web servers to the responding authoritative DNS resolver. The routing protocols that directed the packet to the particular authoritative DNS resolver also dictate the route of subsequent traffic flows to the provider's network. Thus, the closest web server selected by the authoritative DNS resolver is also the closest web server to the client. The client then connects directly with the web server specified by the authoritative DNS resolver.

These methods provide the ability to direct a client to the "closest" available server dynamically, in real-time, without having to build or maintain a map of the Internet. Because the underlying protocols are designed to be dynamic and self correcting for faults or topology changes, accurate traffic routing decisions may be made with reaction time to changes in seconds, as opposed to weeks needed to update a map. Using the same underlying protocols that govern Internet packet flows to make global load balancing decisions, the techniques provide more accurate and timely traffic routing that may result in improved website performance.

Anycast

In an embodiment, anycast is used with the authoritative DNS resolvers placed at different locations on the edges of the network to route a client to the "closest" authoritative DNS resolver. Anycast is a method of routing Internet traffic to one of a plurality of available server locations, each with the same IP address. In an embodiment, more than one of the authoritative DNS resolvers placed on the edges of the network are given the same IP address so that the client IP packet may be routed to the closest authoritative DNS resolver. Anycast is similar to the terms unicast and multicast. In unicast, there is a one-to-one association between source network address and destination network endpoint. In multicast, there is a one-to-many association between source network addresses and destination network endpoints. Each destination address identifies a set of receiver endpoints where all information is replicated. In contrast, anycast is a one-to-any association between source network addresses and potential destination network endpoints. Each destination address identifies a set of receiver endpoints, but only one of them is chosen at any given time to receive information from any given sender.

Anycast does have disadvantages which prevent it from being used for all Internet protocols. For example, anycast is unable to guarantee consistent point-to-point communications and may not be used for web traffic applications that rely on TCP streams where all packets in the TCP stream must reach the same destination. Anycast also is unable to maintain the state of a connection. However, anycast is useful with applications that use single packet request and response protocols such as DNS name resolution.

Anycast may be implemented by using the border gateway protocol ("BGP"). BGP is the core routing protocol of the Internet. BGP works by maintaining routing tables of IP networks or "prefixes" that designate the ability to reach network. The information in a routing table may include, but is not limited to, the IP address of the destination network, the cost of the path through which the packet is to be sent, and the address of the next station to which the packet is to be sent on the way to destination, also called the "next hop." BGP then makes routing decisions based on available paths and network policies. For example, if there are two paths available to the same destination with the first path costing less than the second path, then the first path routing might be selected if cost was the primary issue. In another example, if there are two paths available to the same destination, routing may be determined by which path allows a packet to reach the destination fastest. This returns the "closest" route. The criteria for selecting paths may vary from implementation to implementation.

Anycast has seen widespread use with DNS. For example, in DNS, a client might send a single packet request for name resolution to a large network where any one of a plurality of authoritative DNS resolvers reply. As no state of the connection or TCP stream is required to fulfill this request, DNS is an ideal application for anycast. In anycast, the same prefix, or block of destination IP addresses, is announced simultaneously from many different locations on the Internet. IP packets that are addressed to a particular prefix are then able to be routed to the "closest" location on the Internet that announced the given prefix.

In an embodiment, DNS administrators deploy multiple servers across multiple locations masked behind a single IP address on the edges of a network. Using BGP, the authoritative DNS resolvers, or routers in front of the authoritative servers, advertise routes to their destination IP block from the edges of the network to the Internet at large. As used herein, authoritative DNS resolvers may refer to the authoritative DNS resolvers themselves, routers in front of the authoritative DNS resolver, or GLB servers that may be a part of an authoritative DNS resolver, when advertising routes to the authoritative DNS resolvers' IP block.

When a client wishes to connect to a network, the client sends a name resolution IP packet to the network. The incoming IP packet is routed, based upon the BGP tables, by the shortest path from the client to the "closest" authoritative DNS resolver in the provider's network.

Figure 2:
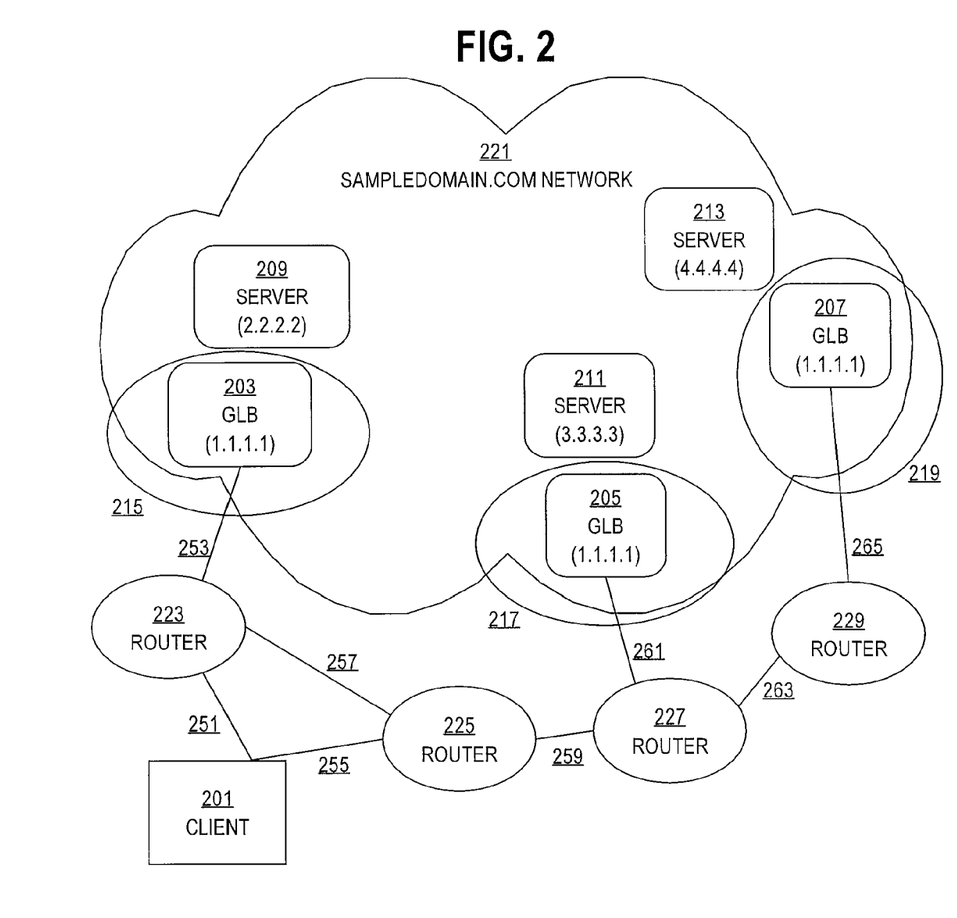
FIG. 2 is a diagram of a name resolving request IP packet routed to the nearest GLB/authoritative DNS server, according to an embodiment of the invention.

An example of this technique is shown in FIG. 2. In FIG. 2, a client 201 wishes to connect to network 221. An example of a network might be the network for the domain "www.sampledomain.com." Placed at different locations on the edges, or entry points, of the network 219 are authoritative DNS resolvers (with global load balancing). Entry point 215 contains DNS resolver 203, entry point 217 contains DNS resolver 205, and entry point 219 contains DNS resolver 207. The network also comprises web servers 209, 211, and 213 that are able to connect to a client.

Using anycast, more than one of the authoritative DNS resolvers, or routers in front of the authoritative DNS resolvers, announce the same IP destination address, or prefix, for the "www.sampledomain.com" network to the neighboring networks, and through these neighboring networks, to the Internet at large. Based at least in part on that announcement, BGP generates routing tables stored in routers 223, 225, 227 and 229. When the client 201 wishes to connect to the "www.sampledomain.com" network, client 201 sends out a name resolving IP packet. The IP packet may follow any path to the network. If the IP packet follows path 251, then the IP packet reaches router 223. Router 223 contains a routing table that shows a connection to the authoritative DNS resolver 203 via path 253. Path 257 from router 223 connects to router 225. If the IP packet follows path 255, then the IP packet arrives at router 225. At router 225, path 259 leads to router 227. From router 227, path 261 may be taken to the network and DNS resolver 205. Path 263 leads to router 229. Router 229 may connect to DNS resolver 207 via path 265. Thus, client 201 may connect to DNS resolver 203 via one router (router 223) hop, to DNS resolver 205 via two router hops (routers 225, 227), and to DNS resolver 207 via three router hops (routers 225, 227, 229).

Based upon BGP, the IP packet is routed to network 221 using the shortest path. In some instances, taking path 251 and path 253 to authoritative DNS resolver 203 may be the closest geographically and by speed. In other instances, a geographically longer path, such as path 255-259-261 might be "closer" by speed and the IP packet is routed on that path.

Selecting the Closest Web Server

In an embodiment, global load balancing ("GLB") allows the authoritative DNS resolvers to provide dynamic responses to the incoming name resolution request. Once the name resolution request is received by the "closest" authoritative DNS resolver using anycast, a response is made with the IP address of the "closest" available web server to that authoritative resolver. As used herein, "close" web servers may be determined by many factors including, but not limited to, the geographical proximity, traffic load, operability, and health of a web server.

Because the underlying routing protocols that directed the IP packet from the client to the particular authoritative DNS resolver also dictate the route of subsequent connection traffic to the provider's network, the "closest" web server to the authoritative DNS resolver is also the "closest" web server to the client.

In an embodiment, determining which web server is "closest" to the authoritative DNS resolver may be performed during regular health checks. In a health check of web servers, an authoritative DNS resolver polls all of the configured web servers. The authoritative DNS resolver collects information about which servers are available and which servers are closest. Availability may be determined by examining the health of the web servers and the closeness may be determined by the latency of the responses from the web server to the authoritative DNS resolver. Once this information is collected and processed, the authoritative DNS resolver then responds to the name resolution request with the IP address of the closest available web server. Because the subsequent TCP traffic flow passes by the authoritative DNS resolver on the edge of the network to reach the web server, the web server is also the closest available web server to the client.

Figure 3A:
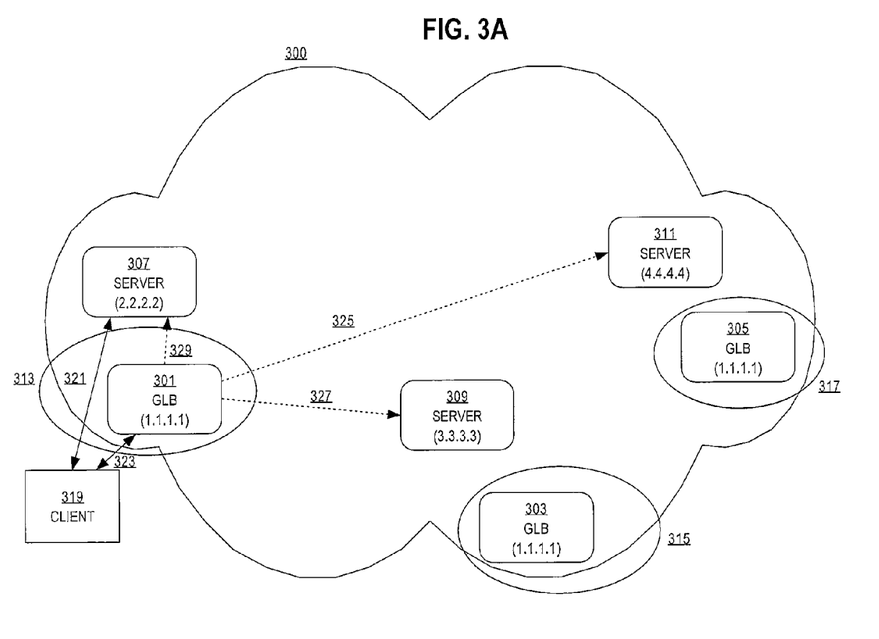
FIG. 3A is a diagram of a client connecting to a web server, according to an embodiment of the invention.

An example of a client connecting to a server, according to an embodiment of the invention, is shown in FIG. 3A. A client 319 wishes to connect to network 300. Located at the edges, or entry points, of the network are GLBs (with authoritative DNS resolvers) 301, 303, and 305 that advertise the destination IP address of "1.1.1.1." Entry point 313 contains DNS resolver 301, entry point 315 contains DNS resolver 303, and entry point 317 contains DNS resolver 305.

The network also comprises web servers that are able to make a TCP connection with the client. In the example, web server 307 has an IP address of "2.2.2.2." Web server 309 has an IP address of "3.3.3.3" and web server 311 has an IP address of "4.4.4.4."

When the client 319 wishes to connect to the network 300, the client 319 sends a name resolving IP packet to the network 300. The IP packet is routed to the "closest" authoritative DNS resolver 301 via BGP. The anycast and BGP process is not illustrated in this particular figure. In the example, client 319 sends an IP packet that is routed via path 323 to the "closest" authoritative DNS resolver, which in this case is authoritative DNS resolver 301. Authoritative DNS resolver 301 has already performed health checks of each of the available web servers. Authoritative DNS resolver 301 polls web server 307 through path 329, web server 309 through path 327, and web server 311 through path 325. In the example, authoritative DNS resolver 301 determines that web server 307 is the "closest." Authoritative DNS resolver 301 then sends the IP address of web server 307 ("2.2.2.2") to the client 319. The client then makes a connection using the same underlying protocols to the edge of the network where authoritative DNS resolver 301 is located and connects to web server 307. Thus, client 319 is able to connect to the closest web server 307 without generating maps of the Internet.

Server Failover

In an embodiment, in cases where there is no web server close to the selected authoritative DNS server, or a web server has failed, the connection from the client to the web server still passes through the same network entry point as the selected authoritative DNS resolver. This may occur in failover or overload feedback. As used herein, failover of a server refers to the capability to switch over automatically to a redundant or standby server upon the failure or abnormal termination of the previously active server. Overload feedback, as used herein, refers to information from servers or a network indicating that the amount of work or network traffic exceeds a specified threshold and that connection requests should be made to a different server. This is displayed in FIG. 3B.

Figure 3B:
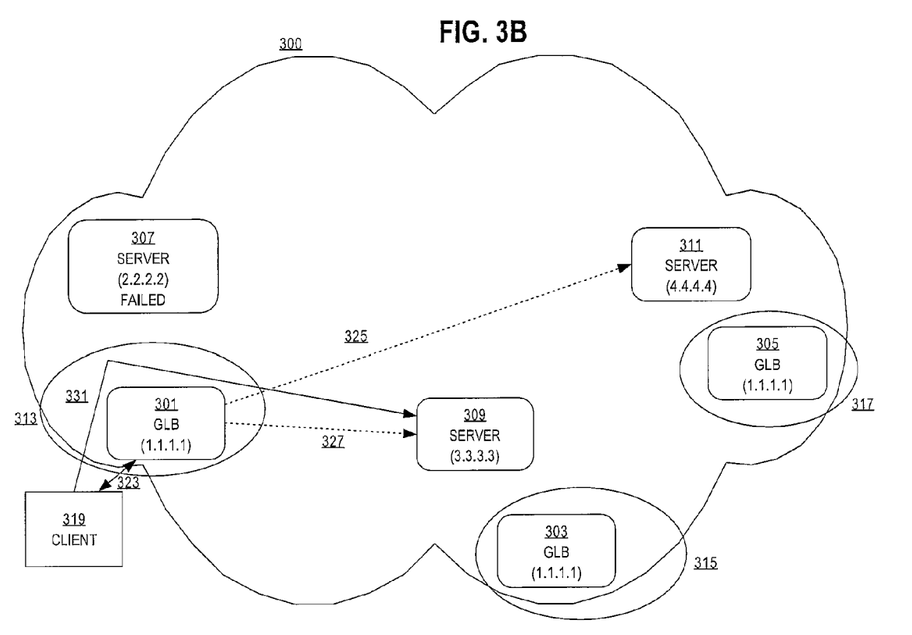
FIG. 3B is a diagram of a client connecting to a web server where failover has occurred, according to an embodiment of the invention.

In FIG. 3B, the web server 307 has failed. This may be due to operational failure or traffic overload. The failure is detected by authoritative DNS resolver 301 under normal health checks. The client is routed to the same "close" authoritative DNS resolver 301 as shown in FIG. 3A. Under this circumstance, the client still passes through the same network entry point 313. Authoritative DNS resolver 301 determines that web server 309, and not web server 307 that has failed, is the "closest" web server. Authoritative DNS resolver 301 sends to the client 319 the IP address of web server 309 ("3.3.3.3"). Client 319 then connects through entry point 313 and takes path 331 to connect to web server 309.

In an embodiment, when a web server fails as a client is connected to the web server, the client re-sends a name resolution IP packet to the network to re-connect to the network. The IP packet may be routed to the same authoritative DNS resolver as when the initial connection was made. The authoritative DNS resolver selects a web server based upon polled availability and proximity. The web server that has failed should no longer be available. The IP address of the newly selected web server is sent to the client and a connection is established from the client to the newly selected web server.

Hardware Overview

Figure 4:
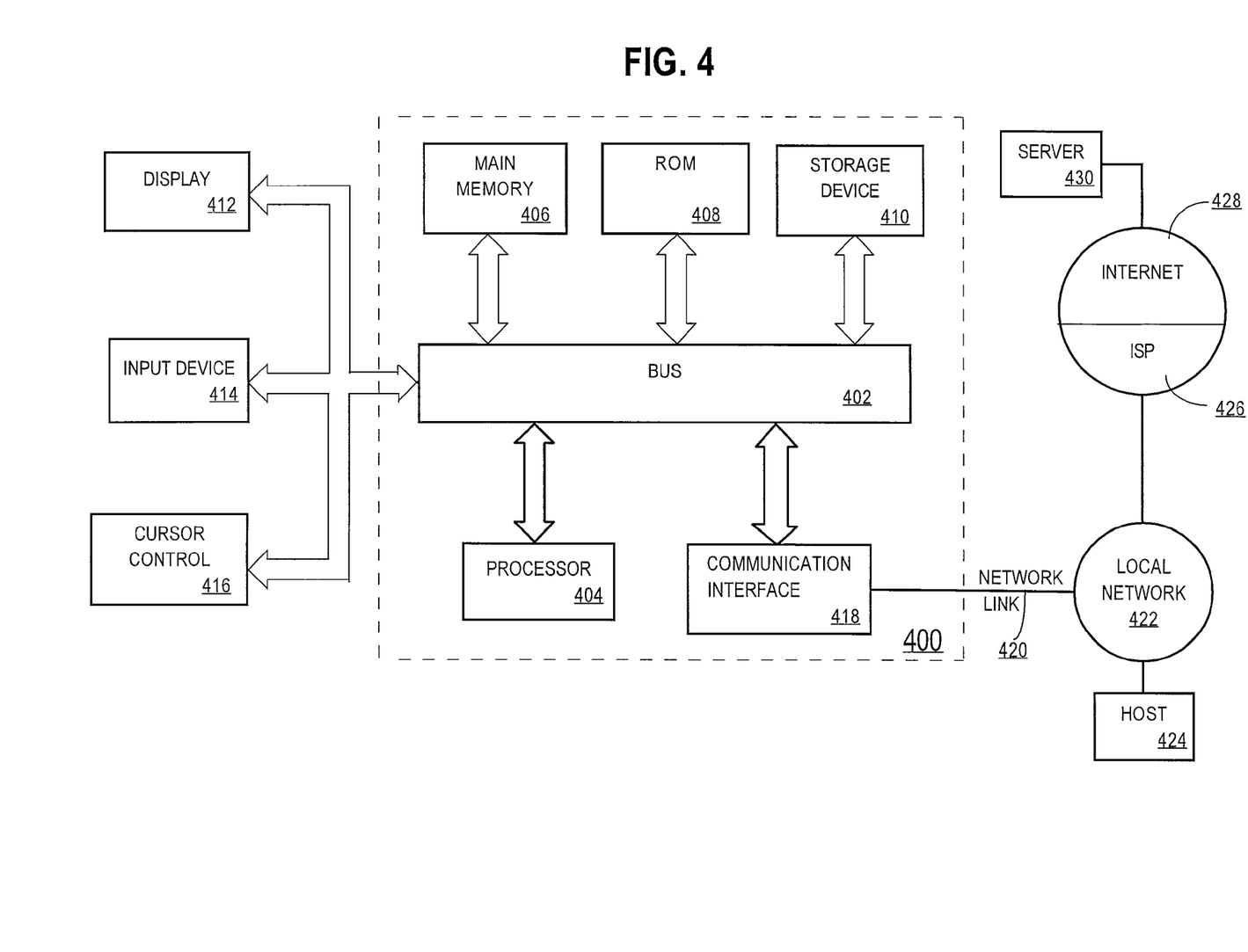
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   maintaining, at a load balancing resolver, a list of servers mapped to a domain name;
   wherein the list of servers that are mapped to the domain name includes a plurality of servers, each server of which has a different address than each other server in the plurality of servers, and each server of which has a separate closeness measure that measures closeness of the server to the load balancing resolver;
   receiving, at the load balancing resolver, a request from a client to identify an address that corresponds to the domain name;
   performing a comparison of the closeness measures of the servers in the plurality of servers;
   based at least in part on the comparison, selecting a particular server that is mapped to the domain name from the plurality of servers;
   wherein the particular server is selected based, at least in part, on nearness of the particular server to the load balancing resolver, which nearness is indicated by the closeness measure of the particular server;
   wherein the particular server has a particular address;
   in response to the request to identify an address that corresponds to the domain name, based on the selecting, the load balancing resolver responding to the client with a message specifying that the domain name corresponds to the particular address of the particular server;
   wherein the method is performed by one or more computing devices.

2. The method of claim 1,
   wherein the request is an Anycast message directed to an Anycast address;
   wherein the load balancing resolver is one of a plurality of load balancing resolvers sharing the Anycast address.

3. The method of claim 1, wherein the load balancing resolver does not maintain mapping information that indicates a measure of closeness between the client and the particular server.

4. The method of claim 1, wherein the load balancing resolver does not maintain mapping information that indicates a measure of closeness between the client and the load balancing resolver.

5. The method of claim 1, wherein the load balancing resolver is an authoritative nameserver.

6. The method of claim 1, wherein both the load balancing resolver and the servers in the list of servers are in a first logical network, wherein the client is in a second logical network.

7. The method of claim 1, wherein the servers in the list of servers are in a first logical network, wherein the load balancing resolver is at the edge of the first logical network, and wherein the client is in a second logical network.

8. The method of claim 1, wherein the closeness measure is based on one or more of: a measure of geographic proximity; a measure of connection speed between the load balancing resolver and the particular server; a measure of traffic load between the load balancing resolver and the particular server; and a measure of response latency between the load balancing resolver and the particular server.

9. The method of claim 1, wherein the particular server is selected because the particular is closer to the load balancing resolver than any other active server in the list of servers.

10. The method of claim 1, further comprising the load balancing resolver monitoring connections to each server in the list of servers, wherein the selecting is based at least upon said monitoring.

11. One or more non-transitory computer-readable storage media storing instructions that, when executed by one or more computing devices, cause performance of the method recited in claim 1.

12. One or more non-transitory computer-readable storage media storing instructions that, when executed by one or more computing devices, cause performance of the method recited in claim 2.

13. One or more non-transitory computer-readable storage media storing instructions that, when executed by one or more computing devices, cause performance of the method recited in claim 3.

14. One or more non-transitory computer-readable storage media storing instructions that, when executed by one or more computing devices, cause performance of the method recited in claim 4.

15. One or more non-transitory computer-readable storage media storing instructions that, when executed by one or more computing devices, cause performance of the method recited in claim 5.

16. One or more non-transitory computer-readable storage media storing instructions that, when executed by one or more computing devices, cause performance of the method recited in claim 6.

17. One or more non-transitory computer-readable storage media storing instructions that, when executed by one or more computing devices, cause performance of the method recited in claim 7.

18. One or more non-transitory computer-readable storage media storing instructions that, when executed by one or more computing devices, cause performance of the method recited in claim 8.

19. One or more non-transitory computer-readable storage media storing instructions that, when executed by one or more computing devices, cause performance of the method recited in claim 9.

20. One or more non-transitory computer-readable storage media storing instructions that, when executed by one or more computing devices, cause performance of the method recited in claim 10.

21. A system comprising:
- a plurality of processors;
- a plurality of network link components configured to receive messages directed to a same Anycast address;
- a plurality of domain resolution components, implemented by the plurality of processors, configured to respond to requests from clients to identify an address that corresponds to a domain name by: (a) selecting a server in a list of servers assigned to the domain name; (b) providing an address of the selected server to the clients;
- a plurality of measuring components, each configured to identify, for each server in the list of servers, a separate closeness measure that measures closeness of the server to an associated network link component of the plurality of network link components;
- a plurality of comparison components configured to perform comparisons of the closeness measures of the servers in the plurality of servers;
- wherein the plurality of domain resolution components are further configured to select an address, to identify as corresponding to the domain name, based at least upon the comparisons of the closeness measures; and
- wherein the plurality of domain resolution components are each further configured to select an address based, at least in part, on nearness of a server, associated with the address, to an associated network link component, which nearness is indicated by a closeness measure identified, by an associated measuring component, for the server associated with the address.

* * * * *